United States Patent [19]
Ludwig

[11] 4,084,042
[45] Apr. 11, 1978

[54] SECONDARY BATTERY OR CELL WITH POLYSULFIDE WETTABLE ELECTRODE #1

[75] Inventor: Frank A. Ludwig, Southfield, Mich.

[73] Assignee: Ford Motor Company, Dearborn, Mich.

[21] Appl. No.: 779,972

[22] Filed: Mar. 22, 1977

Related U.S. Application Data

[63] Continuation-in-part of Ser. No. 653,865, Jan. 30, 1976, abandoned.

[51] Int. Cl.² ............................................ H01M 10/36
[52] U.S. Cl. .................................... 429/104; 429/191; 429/218; 429/245
[58] Field of Search ............... 429/104, 102, 103, 30, 429/31, 191, 245, 218

[56] References Cited
U.S. PATENT DOCUMENTS

| | | | |
|---|---|---|---|
| 3,811,943 | 5/1974 | Minck et al. | 429/104 |
| 3,841,912 | 10/1974 | Kagawa et al. | 429/104 |
| 3,980,496 | 9/1976 | Ludwig et al. | 429/105 X |
| 4,024,320 | 5/1977 | Gibson et al. | 429/104 |

Primary Examiner—Anthony Skapars
Attorney, Agent, or Firm—Roger L. May; Keith L. Zerschling

[57] ABSTRACT

An improved secondary battery or cell of the type having: (A) one or more anodic reaction zones; (B) one or more cathodic reaction zones (C) a cation-permeable barrier to mass liquid transfer interposed between and in contact with said anodic and cathodic reaction zones; and (D) an electrode which is disposed within said cathodic reaction zone. The improvement comprises employing an electrode, at least a portion of which consists essentially of a porous metal substrate which (i) is coated, at least in part, with an oxide of a metal selected from the group consisting of: (a) metals of Groups I, II and III of the Periodic Table of elements, (b) Transition Series metals, and (c) tin, lead, antimony and bismuth to a thickness which is greater than about 500 angstroms, but which results in said electrode portion having a resistivity of less than about 4 ohm-cm², (ii) does not fill the entire volume of said cathodic reaction zone, and (iii) is, at least in part, adjacent to and contiguous with said cation-permeable barrier.

12 Claims, 5 Drawing Figures

SECONDARY BATTERY OR CELL WITH POLYSULFIDE WETTABLE ELECTRODE #1

The invention herein described was made in the course of or under a contract or subcontract thereunder with the National Science Foundation.

This application is a continuation-in-part of Ser. No. 653,865 filed Jan. 30, 1976, now abandoned and relates to an improved secondary cell or battery of the type comprising at least one molten alkali metal anode, at least one cathode, a liquid electrolyte electrochemically reversibly reactive with said alkali metal and in contact with said cathode, and a cation-permeable barrier to mass liquid transfer interposed between and in contact with said anode and said liquid electrolyte.

More particularly, this application relates to an improved alkali metal/sulfur battery or cell of increased ampere-hour capacity.

BACKGROUND OF THE INVENTION

A recently developed type of secondary or rechargeable electrical conversion device comprises: (A) an anodic reaction zone containing a molten alkali metal anode-reactant, e.g., sodium, in electrical contact with an external circuit; (B) a cathodic reaction zone containing (i) a cathodic reactant comprising sulfur or a mixture of sulfur and molten polysulfide, which is electrochemically reversibly reactive with said anodic reactant, and (ii) a conductive electrode which is at least partially immersed in said cathodic reactant; and (C) a solid electrolyte comprising a cation-permeable barrier to mass liquid transfer interposed between and in contact with said anodic and cathodic reaction zones. As used herein the term "reactant" is intended to mean both reactants and reaction products.

During the discharge cycle of such a device, molten alkali metal atoms such as sodium surrender an electron to an external circuit and the resulting cation passes through the solid electrolyte barrier and into the liquid electrolyte to unite with polysulfide ions. The polysulfide ions are formed by charge transfer on the surface of the electrode by reaction of the cathodic reactant with electrons conducted through the electrode from the external circuit. Because the ionic conductivity of the liquid electrolyte is less than the electronic conductivity of the electrode material, it is desirable during discharge that both electrons and sulfur be applied to and distributed along the surface of the conductive material in the vicinity of the cation-permeable solid electrolyte. When the sulfur and electrons are so supplied, polysulfide ions can be formed near the solid electrolyte and the alkali metal cations can pass out of the solid electrolyte and the alkali metal cations can pass out of the solid electrolyte into the liquid electrolyte and combine to form alkali metal polysulfide near the solid electrolyte.

During the charge cycle of such a device when a negative potential larger than the open circuit cell voltage is applied to the anode the opposite process occurs. Thus electrons are removed from the alkali metal polysulfide by charge transfer at the surface of the electrode and are conducted through the electrode material to the external circuit, and the alkali metal cation is conducted through the liquid electrolyte and solid electrolyte to the anode where it accepts an electron from the external circuit. Beacause of the aforementioned relative conductivities of the ionic and electronic phases, this charging process occurs preferentially in the vicinity of the said electrolyte and leaves behind molten elemental sulfur. As can be readily appreciated the production of large amounts of sulfur near the surface of the cation-permeable membrane has a limiting effect on rechargeability. This is the case since sulfur is nonconductive and when it covers surfaces of the electrode, charge transfer is inhibited and the charging process is greatly hindered or termineated. Thus, in order to improve the rechargeability of a cell of this type it is necessary not only to supply polysulfide to the surface of the porous electrode in the vicinity of the cation-permeable membrane, but also to remove sulfur therefrom.

U.S. Pat. No. 3,811,493 and U.S. Pat. No. 3,980,496 both disclose energy conversion device designs which allow or promote improved mass transportation of reactants and reaction products to and from the vicinity of the solid electrolyte and the electrode during both discharge and charge. In the device disclosed in U.S. Pat. No. 3,811,493 an ionically conductive solid electrolyte is located between a first reactant in one container and a second reactant in another container. An electrode for one of the reactants comprises a layer of porous, electronically conductive material having one surface in contact with one side of the ionically conductive solid electrolyte and the other surface in contact with a structurally integral electronically conductive member permeable to mass flow of its reactant and electrically connected to the external circuit. An open volume exists between the structurally integral conductive member and the container wall to promote free flow and mixing of the reactant. Reactants also flow readily through the conductive member into the layer of porous electronically conductive material. The conductive material which in turn electrons to or from the reactants.

The improvement disclosed in U.S. Pat. No. 3,980,496 comprises designing the cathodic reaction zone of the device such that there are a plurality of channels and/or spaces within said zone which are free of porous conductive electrodes and which are thus adapted to allow free flow of the molten cathodic reactants during operation of the device. This flow results from free convection within the channels and/or spaces, and from wicking of cathodic reactants within the conductive porous material.

U.S. Pat. No. 3,976,503 discloses an improved method for recharging secondary batteries or cells of the above-described type. The process involves maintaining a temperature gradient within the cathodic reaction zone during recharging such that the temperature of the cathodic reactants in a first region adjacent the solid electrolyte or cation-permeable barrier is sufficiently higher than the temperature of said reactants in a second region not adjacent the barrier such that sulfur in the first region vaporizes and is transported to said second region where it condenses.

U.S. Pat. No. 3,966,492 discloses an improved secondary battery or cell of the type described above which exhibits increased ampere-hour capacity as the result of an improvement which comprises: (a) employing a porous conductive material which will wick both sulfur and alkali metal polysulfides and which, in different regions of said cathodic reaction zone exhibits different degrees of wettability by said alkali metal polysulfides, and said material in a region adjacent to said cation-permeable barrier being more readily wetted by said polysulfides than is said material in a region further removed from said barrier such that sulfur will boil near said barrier and condense away from it; (b) disposing said porous conductive material within said cathodic reaction zone such that it forms and encloses one or more channels which extend from said region of said cathodic reaction zone which is further removed from said barrier; and (c) maintaining the amount of molten cathodic reactant within said cathodic reaction zone such that said channels remain free of said molten reactant and are thus adapted to transport sulfur vapor.

U.S. Pat. No. 3,951,689 discloses still another improved secondary battery or cell of the type described above which exhibits increased ampere-hour capacity as the result of an improvement which comprises: adapting the cathodic reaction zone to operate as a gas fuel cell electrode by employing a sulfur storage chamber containing molten sulfur connected with said cathodic reaction zone so as to allow sulfur vapors to pass therebetween, the storage chamber being adapted to be maintained at a temperature (i) above the temperature of said cathodic reaction zone when said cell is being discharged such that sulfur distills into said cathodic reaction zone and (ii) below the temperature of said storage chamber.

The devices of U.S. Pat. Nos. 3,966,492 and 3,951,689 each employ electrode materials which are preferentially wet by polysulfide salts as is the case in the invention covered by this application. However, unlike the invention of this application, each also eaches the use of such a material in conjunction with an electrode material which is preferentially wet by sulfur. Also each of those devices, unlike the device of this application, relies on vapor transport for the removal of objectionable sulfur from the region of the electrode near the cation-permeable barrier. The process U.S. Pat. No. 3,976,503 also relies on vapor transfer of sulfur and requires the maintaining of a temperature gradient using external hearing elements.

U.S. Pat. No. 4,002,806 teaches increasing the ampere-hour capacity of a secondary battery or cell of the type described by including certain metals, metal salts and other metal compounds in the cathodic reactant. The mechanism by which these materials increase ampere-hour capacity of the device is not known. One of several theories mentioned in the application is that the materials may to an extent coat the graphite felt, thereby rendering it preferentially wettable by polysulfide and, thus, increasing charge efficiency. Such a mechanism, as stated therein, is only one of several possibilities, and is not certain. It is just as likely that, when hese materials are dissolved in or mixed with the polysulfide melt they import general or localized electronic conductivity to the melt, thereby extending the effective electrode area, altering the electrode kinetics and improving charge capacity. A still further theory suggests that the materials disperse in the melt as a solid phase and thereby increase effective electrode area so as to increase capacity. In any event, the battery or cell disclosed in U.S. Pat. No. 4,002,806, unlike the battery or cell made in accordance with the improvement of this invention, requires the addition of materials to the cathodic reactant.

The prior art designs disclosed and claimed in U.S. Pat. Nos. 3,811,493 and 3,980,496 are effective in promoting distribution of reactants during both discharge and charge. However, even with these improved designs it is difficult to recharge the batteries or cells at high rates.

It has been found that by employing the improvement of this invention, which may be combined effectively with the improvements of U.S. Pat. No. 3,980,496, it is possible to obtain a cell which, without the necessity of external hearing or cooling or other modifications, exhibits a high efficiency on charging, thus increasing the ampere-hour capacity of the battery or cell.

BRIEF DESCRIPTION OF THE INVENTION

The improvement of this invention comprises employing in a secondary battery or cell of the above-described type an electrode, at least a portion of which consists essentially of a porous metal substrate which (i) is coated, at least in part, with an oxide coating which renders the electrode portion considerably more readily wettable by molten polysulfide than by molten sulfur (i.e., the coated electrode portion exhibits a contact angle with molten polysulfide salts which is less than the contact angle which it exhibits with molten sulfur), (ii) does not fill the entire volume of the cathodic reaction zone of the device, and (iii) is, at least in part, adjacent to and contiguous with the cation-permeable barrier by the battery or cell.

The invention will be more fully understood after reading the following detailed description thereof in conjunction with the drawings in which.

DETAILED DESCRIPTION OF THE INVENTION

Figure 1:
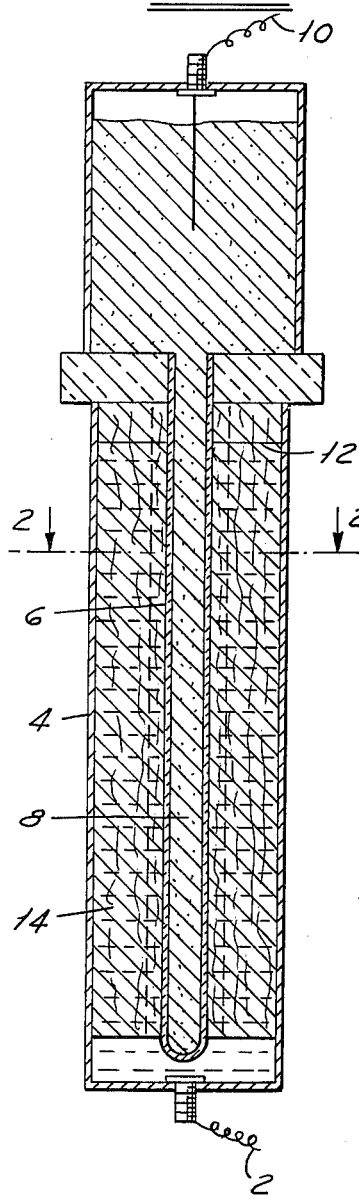
FIG. 1 is a vertical sectional view of a cell design suitable for use with the improvement of this invention.

Description of Device to which Improvement Applies

The type of secondary or rechargeable electrical conversion devices to which the improvement of this invention applies and various components thereof are disclosed in the following United States patents, the disclosures of which are incorporated herein by reference: U.S. Pat. Nos. 3,404,035; 3,404,036; 3,466,677; 3,458,356; 3,468,709; 3,468,719; 3,475,220; 3,475,223; 3,475,225; 3,535,163; 3,719,531; 3,811,493; 3,951,689; 3,966,492; 3,976,503; 3,980,496; 3,985,575; 3,985,576; 3,993,503; 3,994,745; 4,002,806; and 4,002,807.

As mentioned above, the secondary batteries or cells to which the improvement of this invention applies comprise generally: (1) an anodic reaction zone containing a molten alkali metal reactant-anode in electrical contact with an external circuit; (2) a cathodic reaction zone containing (a) a cathodic reactant comprising a liquid electrolyte selected from sulfur or a mixture of sulfur and sulfur saturated polysulfide of said molten alkali metal reactant which is electrochemically reversibly reactive with said anodic reactant and (b) an electrode which is at least partially immersed in said cathodic reactant and (3) a cation-permeable barrier to mass liquid transfer interposed between and in contact with said anodic and cathodic reaction zones, said electrode being in electrical contact with both said cation-permeable barrier and the external circuit.

The anodic reactant employed in such devices is an alkali metal which is maintained above its melting point when the device is in operation. The anodic reactant is heated by any conventional means including, not by way of limitation, Joule heating, induction heating, and heat exchange with a suitable fluid. The anodic reactant may also be viewed as the anode proper or conductor through which the electron flow to the external circuit is achieved. A cell component of this type is conventionally referred to in the art as a sacrificial electrode in that while it is serving the role of a conductor, it is also undergoing electrochemical reaction. Molten sodium is employed as the anodic reactant in most preferred embodiments of such devices. However, potassium, lithium, other alkali metals, mixtures of such alkali metals, or alloys containing such alkali metals can be used.

The cathodic reactant of the fully charged battery or cell is molten sulfur, which is electrochemically reversibly reactive with the anodic reactnat. As the device begins to discharge, the mole fraction of elemental sulfur drops while the open circuit voltage remains constant. During this portion of the discharge cycle as the mole fraction of sulfur drops from 1.0 to approximately 0.72 the cathodic reactant displays two phases, one being essentially pure sulfur and the other being sulfur saturated alkali metal polysulfide in which the molar ratio of sulfur to alkali metal is about 5.2:2. When the device is discharged to the point where the mole fraction of sulfur is about 0.72 the cathodic reactant becomes one phase in nature since all elemental sulfur has formed polysulfide salts. As the device is discharged further, the cathodic reactant remains one phase in nature and as the mole fraction of sulfur drops so does the open circuit voltage corresponding to the change in the potential determining reaction. Thus, the device continues to discharge from a point where polysulfide salts contain sulfur and alkali metal in a molar ratio of approximately 5.2:2 to the point where polysulfide salts contain sulfur and alkali metal in a ratio of about 3:2. At this point the device is fully discharged.

Since in the fully discharged state the polysulfide melt is single phase in nature, the activity of sulfur in the melt is substantially less than unity when the mole fraction of sulfur is about 0.60 and approaches unity as the mole fraction approaches 0.72, the point at which the polysulfide is sulfur saturated. As the cell is recharged, elemental sulfur is formed momentarily on the surfaces of the electrode in the vicinity of the solid ceramic electrolyte. Since sulfur is nonconductive, the presence of elemental sulfur on the electrode could cause difficulty in continuing the recharging process. However, when the mole fraction of sulfur in the melt is between about 0.60 and about 0.72, i.e., the single phase region, the sulfur which forms on the surface of the electrode tends to react immediately with the polysulfide melt in the vicinity thereof to form a second polysulfide in which the molar ratio of sulfur to alkali metal is greater than 3:2. This process occurs until the molar ratio of sulfur to alkali metal is approximately 5.2:2. This is the point where the mole fraction of sulfur is approximately 0.72 and the open circuit voltate becomes constant.

As charging of the cell or battery continues, the sulfur saturated polysulfide will no longer react with elemental sulfur deposited on the electrode to form polysulfide having a greater mole ratio of sulfur to alkali metal. Thus, as the charging cycle continues the cathodic reactant becomes two phase in nature. One phase is elemental sulfur and the other is sulfur saturated alkali metal polysulfide in which the molar ratio of sulfur to alkali metal is about 5.2:2, with the mole fraction of sulfur in the cathodic reaction zone continually increasing as the recharging cycle progresses. It is in this region of the recharging cycle that substantial difficulties are confronted because of the formation of large amounts of nonconductive elemental sulfur on porous electrode surfaces. In fact, it is extremely difficult to recharge such secondary cells or batteries to any great extent past the point at which the polysulfide becomes saturated with sulfur and thus the deposition of elemental sulfur has a limiting effect on rechargeability.

The anodic reactant is separated from the cathodic reactant by a solid barrier to mass liquid transfer that is selectively ionically conductive with respect to cations of the anodic reactant and substantially impermeable to other ions which may be stored in the cathodic reactant. Thus, the reaction zone separator or solid electrolyte is a material which will permit the transfer of the ions of the anodic reactant through the separator and into the cathodic reactant during operation of the device. The cathodic reactant together with the separator provides a sufficient barrier to free electron flow in the internal portion of the electrical circuit to permit a difference of potential to develop at the respective electrodes of the devices in operation. It is preferred that the separator be as thin as possible without unduly sacrificing strength. Although optimum thickness may vary with intended use, separators having a thickness in the range of about 20 to about 2,000, preferably about 100 to about 1,000, microns have been found to be effective.

Both glasses and polycrystalline ceramic materials have been found suitable for use in such devices as the solid electrolyte or reaction zone separators. Among the glasses which may be used with such devices and which demonstrate an unusually high resistance to attack by molten alkali metal are those having the following composition: (1) between about 47 and about 58 mole percent sodium oxide, about 0 to about 15, preferably about 3 to about 12, mole percent of aluminum oxide and about 34 to about 50 mole percent of silicon dioxide; and (2) about 35 to about 65, preferably about 47 to about 58, mole percent sodium oxide, about 0 to about 30, preferably about 20 to about 30, mole percent of aluminum oxide, and about 20 to about 50, preferably about 20 to about 30, mole percent boron oxide. These glasses may be prepared by conventional glass making procedures using the listed ingredients and firing at temperatures of about 2700° F.

The polycrystalline ceramic materials useful as reaction zone separators of solid electrolytes are bi- or multi-metal oxides. Among the polycrystalline bi- or multi-metal oxides most useful in the devices to which the process of this invention applies are those in the family of Beta-alumina all of which exhibit a generic crystalline structure which is readily identifiable by X-ray diffraction. Thus, Beta-type alumina or sodium Beta-type-alumina is a material which may be thought of as a series of layers of aluminum oxide held apart by columns of linear Al-O bond chains with sodium ions occupying sites between the aforementioned layers and columns. Among the numerous polycrystalline Beta-type-alumina materials useful as reaction zone separators or solid electrolytes are the following.

(1) Standard Beta-type-alumina which exhibits the above-discussed crystalline structure comprising a series of layers of aluminum oxide held apart by layers of linear Al-O bond chains with sodium occupying sites between the aforementioned layers and columns. Beta-type-alumina is formed from compositions comprising at least about 80% by weight, preferably at least about 85% by weight, of aluminum oxide and between about 5 and about 15 weight percent, preferably between about 8 and about 11 weight percent, of sodium oxide. There are two well known crystalline forms of Beta-type-alumina, both of which demonstrate the generic Beta-type-alumina crystalline structure discussed hereinbefore and both of which can easily be identified by their own characteristic X-ray diffraction pattern. Beta-alumina is one crystalline form which may be represented by the formula $Na_2O \cdot 11Al_2O_3$. The second crystalline is $\beta''$-alumina which may be represented by the formula $Na_2O \cdot 6Al_2O_3$. It will be noted that the $\beta''$ crystalline form of Beta-type-alumina contains approximately twice as much soda (sodium oxide) per unit weight of material as does the Beta-alumina. It is the $\beta''$-alumina crystalline structure which is preferred for the formation of solid electrolyte or reaction zone separators for the device to which the process of this invention is applicable. In fact, if the less desirable beta form is present in appreciable quantities in the final ceramic, certain electrical properties of the body will be impaired.

(2) Boron oxide $B_2O_3$ modified Beta-type-alumina wherein about 0.1 to about 1 weight percent of boron oxide is added to the composition.

(3) Substituted Beta-type-alumina wherein the sodium ions of the composition are replaced in part or in whole with other positive ions which are preferably metal ions.

(4) Beta-type-alumina which is modified by the addition of a minor proportion by weight of metal ions having a valence not greater than 2 such that the modified Beta-type-alumina composition comprises a major proportion by weight of ions of aluminum and oxygen and a minor proportion by weight of a metal ion in crystal lattice combination with cations which migrate in relation to the crystal lattice as a result of an electric field, the preferred embodiment for use in such electrical conversion devices being wherein the metal ion having a valence not greater than 2 is either lithium or magnesium or a combination of lithium and magnesium. These metals may be included in the composition in the form of lithium oxide or magnesium oxide or mixtures thereof in amounts ranging from 0.1 to about 5 weight percent.

The cathodic electrode is in electrical contact with the cation-permeable barrier and an external circuit. The conductive material is of significantly greater surface area than a solid cathode and may comprise any porous material which is electronically conductive and which is resistant to attack by reactants within the cathodic reaction zone.

While the secondary cells or batteries to which the improvement of this invention is applicable may have a number of different configurations, several of which are disclosed in the above-incorporated patents, a preferred configuration comprises: (1) a container, preferably tubular; (2) a cation-permeable barrier to mass liquid transfer, preferably tubular, which is disposed within said container so as to create an anodic reaction zone within said barrier and a cathodic reaction zone between said barrier and said container; (3) a molten alkali metal anodic reactant within said anodic reaction zone in electrical contact with an external electrical circuit; (4) a cathodic reactant comprising a liquid electrolyte which is electrochemically reversibly reactive with said anodic reactant and which, in at least the partially discharged state is selected from the group consisting of (a) a single phase composition comprising molten polysulfide salts of said anodic reactant and (b) a two phase composition comprising molten sulfur and molten sulfur saturated polysulfide salts of said anodic reactant; and (5) an electrode which is disposed within said cathodic reaction zone, filled at least in part with said cathodic reactant and is in electrical contact with both said barrier and said external circuit. Such secondary cells which are preferably tubular or cylindrical, thus comprise cathodic reaction zones which completely surround the solid electrolyte or reaction zone separator.

Improvement of the Invention

The improved batteries or cells in accordance with this invention serve to overcome difficulties caused by formation of elemental sulfur on the electrode surface near the cation-permeable barrier. The improvement of the invention comprises employing in a secondary battery or cell of the above-described type an electrode, at least a portion of which consists essentially of a porous metal substrate which (i) is coated, at least in part, with an oxide of a metal selected from the group consisting of (a) metals of Groups I, II and III of the Periodic Table of Elements, (b) Transition Series metals, and (c) Tin, lead, antimony and bismuth to a thickness which is greater than about 500 Angstroms, but which results in said electrode portion having a resistivity of less than about 4 ohm-$cm^2$, (ii) does not fill the entire volume of the cathodic reaction zone of the cell and (iii) is, at least in part, adjacent to and contiguous with the cation-permeable barrier of the cell or battery.

Such a coated porous metal substrate is significantly more wettable by molten polysulfide salts than by molten sulfur. The measure of wettability of a substrate by a liquid material is the contact angle formed between the liquid and the substrate. If the liquid completely wets the substrate, the contact angle will be 0°. If the liquid beads up completely on the substrate surface, the contact angle will be 180°. Thus, the lower the contact angle between the liquid and the substrate the greater the wettability of the substrate by the liquid. For example, in helium at 318° C the contact angle formed by molten $Na_2S_4$ on graphite is approximately 100° while the contact angle formed by molten sulfur on graphite is approximately 25°. Thus, graphite is preferentially wet by sulfur as opposed to polysulfide salt and, as such, is unacceptable for use in the improvement of this invention.

It has been found that by employing conductive materials which are preferentially wetted by polysulfide salts it is possible to substantially reduce or eliminate electrode polarization while charging in the two-phase region (sulfur and $Na_2S_{5.2}$) at current densities as high as 545 ma/$cm^2$. This is in contrast to materials which are preferentially wet by sulfur, such as graphite felt electrodes which during charge becomes blocked by sulfur at temperatures between 300° and 350° C at high current densities.

While the polysulfide wettable materials useful as the conductive materials in the improvements of the invention may result in appreciable electrode polarization during discharge it is not so significant as to seriously effect the operation of the device. Secondary batteries or cells incorporating the improvement of the invention are particularly suitable for use in electric utility load leveling applications since such applications require charging in about one-half ($\frac{1}{2}$) the time available for discharging and thus require twice the current on charge as on discharge.

The coating materials employed in accordance with the improvement of the invention to coat the porous metal substrate and thereby render it much more wettable by polysulfide than by sulfur, as noted above, are oxides of metals selected from the group consisting of (a) metals of Groups I, II and III of the Periodic Table of Elements, (b) Transition Series Metals and (c) tin, lead, antimony and bismuth. Preferentially the metal salts or oxides are highly unsoluble in the molten sulfur and polysulfide phases. Preferred materials are: nickel oxide doped chromium oxide (NiO-CrO), lanthanum chromite ($LaCrO_3$), calcium doped lanthanum chromite ($La_{1-x}Ca_xCrO_3$), antimony peroxidedoped tin oxide ($Sb_2O_5$-$SnO_2$), lithium doped nickel oxide ($Li_xNi_{1-x}O$), titanium doped ferric oxide ($Ti_xFe_{2-x}O_3$) and tantalum doped titanium oxide ($Ta_2O_5$-$TiO_2$).

As also noted above, the metal oxide coating on the porous metal substrate must be at least 500 Angstroms in thickness, considerably greater than the thickness of an oxide formed on a metal or alloy in ambient atmosphere. Metals and alloys coated only with such a thin naturally occurring oxide will corrode when exposed to molten sodium polysulfide while metals specially treated to thicken their oxide coatings or those coated with an oxide of a different metal in the requisite thickness corrode much less. For example, the corrosion rates of alloys coated with thin oxide and thick oxide are compared below. For both alloys the thin oxide film was the oxide formed in ambient atmosphere. The thick inconel oxide was formed by exposure to air for 1 hour at 750° C. The thick stainless steel oxide was created by exposure to air for 20 hours at 750° C. Lesser times gave poor corrosion resistance for AISI #446.

| Alloy | Corrosion After 60 Days in $Na_2S_4$ at 400° C Corrosion (mg/cm$^2$) |
|---|---|
| Stainless #446 | |
| -thin oxide | 18.8 |
| -thick oxide | 4.0 |
| Inconel #671 | |
| -thin oxide | 17.8 |
| -thick oxide | 0.2 |

The thick oxide on stainless steel #446 is nonconducting and therefore unsuitable as a continuous electrode coating surface. As noted above, the metal oxide coatings employed in the improvement of the invention should be of such a thickness that the resistivity of the resultant electrode is less than about 4 ohm-cm². In any event the substrate should be covered to a thickness of at least 500 Angstroms, but only to such an extent and in such a thickness as will result in the desired resistivity.

The thick oxide coating on the Inconel #671 (an alloy of chromium and nickel) discussed above not only is very corrosion resistant, but also conductive. The oxide film resistivity was measured to be about 1 ohm-cm² at 300° C.

The polysulfide wettable electrode portion comprising the coated porous metal substrate may, in accordance with the improvement of the invention, be essentially the entire electrode of the device or may serve as only a portion of the total electrode surface of the battery or cell.

The term "coated porous metal substrate" as used herein is intended to mean any metal or alloy thereof (i) which is in the form of a perforated material, an expanded material, a felt, a woven or nonwoven fabric, a sintered material, a foam, a flame sprayed material or other forms which will be apparent to the skilled artisan, and (ii) which is coated with one of the oxides described above.

When the coated porous metal substrate serves as essentially the entire electrode of the battery or cell it is preferably disposed in one of three configurations within the cathodic reaction zone. In one configuration, the coated porous metal substrate is disposed within the cathodic reaction zone in the manner disclosed in U.S. Pat. No. 3,980,496 mentioned previously such that the cathodic reaction zone contains a plurality of channels or spaces which are free of said coated porous conductive material and which, in combination with said coated porous metal substrate are adapted to allow flow within said cathodic reaction zone of said cathodic reactant during operation of the battery or cell.

In a second configuration the coated porous metal substrate is confined to an area of said cathodic reaction zone adjacent to said cation-permeable barrier. For example, a perforated or expanded metal sheet, such as stainless steel, coated with an oxide as described above may be disposed so as to be contiguous with said barrier, but not with the other container wall. Thus, in the preferred tubular configuration for cells of the type to which the improvement relates, the coated perforated or expanded metal sheet could be wrapped around the cation-permeable barrier. An advantage which is achieved by positioning the electrode portion adjacent or contiguous to the cation-permeable barrier is that wetting by polysulfide is enhanced by the capillarity between the electrode portion and the barrier.

In still another configuration the polysulfide wettable electrode portion may be disposed such that there are two major sections, the first section being coated porous metal substrate which is confined to an area of said cathodic reaction zone adjacent to said cation-permeable barrier and the second being coated conductive material which is electrically connected to said first portion, but which is spaced from said first portion so as to create a channel therebetween. In a preferred embodiment both portions may be formed of a coated metal such as stainless steel bearing an oxide coating. Thus, in the preferred tubular configuration discussed previously, a perforated or expanded oxide coated metal sheet is wrapped around the cation-permeable barrier and an oxidecoated metal cylinder, which may or may not be perforated, is disposed concentrically about and spaced from the wrapped barrier.

When the electrode of the battery or cell consists essentially of (i) the coated porous metal substrate and (ii) a second electrode portion, the second electrode portion desirably is formed of a material which during operation of the battery or cell, exhibits a contact angle with sulfur which is less than the contact angle which it exhibits with molten polysulfide, i.e., it is more readily wettable by sulfur than by polysulfide. In those cases where the two electrode portions essentially fill the cathodic reaction zone, it is required that the second electrode portion be more wettable by sulfur. The sulfur wettable conductive material may include such materials as carbon based materials including graphite. For instance the first electrode portion may comprise oxide coated porous metal and the second electrode portion may comprise uncoated graphite.

All of the aforementioned preferred designs and others will be better understood from the following detailed description of the drawings. In each of the drawings the entire electrode is formed of the coated porous metal substrate. However, it will be apparent from the above discussion that areas not filled with coated material may contain said second electrode portion which is preferentially wettable by sulfur.

DETAILED DESCRIPTION OF THE DRAWINGS

Figure 2:
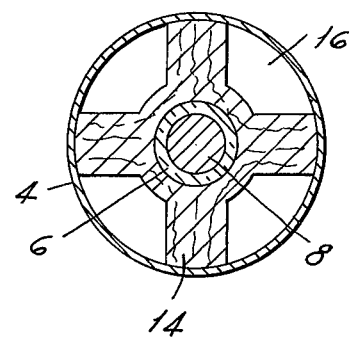
FIG. 2 is a cross-section view of the cell shown in FIG. 1.
Figure 3:
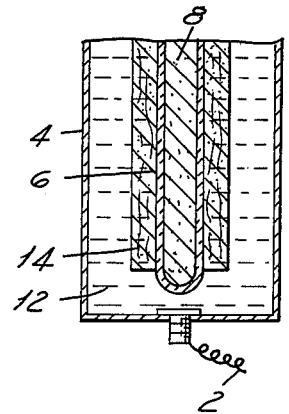
FIGS. 3, 4 and 5 are cut away vertical sections of a portion of the cell showing other designs incorporating the improvement of the invention.
Figure 4:
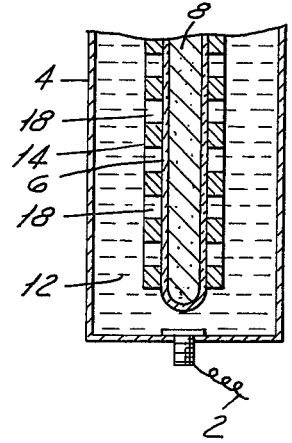
Figure 5:
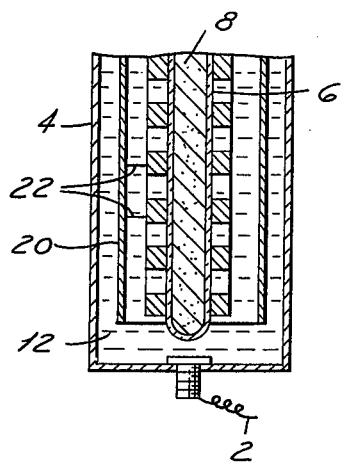

FIG. 1 shows a full vertical cross-section of the preferred tubular type cell to which the improvement of this invention may relate. FIGS. 3, 4 and 5 are merely broken away vertical sections of the lower portion of the cell which show several examples of suitable designs for the electrode portion comprising the coated porous metal substrate. FIG. 2 is a cross-section of FIG. 1 taken along line 2—2. To the extent that the part or material described is shown in each of the figures it will be designated by the same numeral used to describe FIG. 1.

The cell shown in FIG. 1 comprises: a tubular container 4 which may be in electrical contact with an external circuit via lead 2; a tubular cation-permeable barrier to mass liquid transfer 6 which is disposed within said tubular container 4 so as to create an anodic reaction zone within the tubular barrier containing a molten alkali metal reactantanode 8 which is in electrical contact via lead 10 to an external circuit; a cathodic reaction zone between tubular barrier 6 and tubular container 4; a molten cathodic reactant 12 and a porous electrode 14 which is disposed within the cathodic reaction zone.

FIG. 1 and its cross-section FIG. 2 are representative of the type of cell design disclosed in U.S. Pat. No. 3,980,496 discussed above wherein porous conductive material 14 is disposed within the cathodic reaction zone such that said zone contains a plurality of channels or spaces 16 which are free of said porous conductive material and which, in combination with said porous conductive material are adapted to allow flow within said cathodic reaction zone of said cathodic reactant during operation of the barrery or cell.

FIGS. 3 and 4 show all designs where porous conductive material 14 is confined to an area adjacent cationpermeable barrier 6. The material 14 is illustrated as a oxide coated metal felt in FIG. 3 and as an oxide coated perforated metal sheet with openings in FIG. 4.

FIG. 5 shows a cell design where, in addition to a first portion of porous conductive material 14 confined to the area adjacent the barrier 6, there is a second conductive material 20 which may or may not be porous. In the embodiment illustrated, the material 14 is an oxide coated perforated metal sheet and the material 20 is a solid cylinder of an oxide coated metal which is disposed such that a cathodic reactant can flow around it at the top and bottom of the cathodic reaction zone. Material 20 may also be porous or perforated to allow flow of reactant therethrough. In any event, however, the disposition of materials 14 and 20 as illustrated does create a vertical channel in the cell such that a chimney effect is created, thus increasing free convective flow of reactants. Electrode material 20 and electrode 14, of course, are electrically connected such as by wires 22.

In order to still further illustrate the improvement of the invention several specific examples are set forth below.

EXAMPLE I

A sodium/sulfur cell as described, was construed with an electrode of stainless steel AISI #446 perforated sheet, 0.025 inches thick. The metal was coated only with its naturally occurring oxide. The perforations removed 40% of the sheet area. The sheet was formed into a cylinder and fitted snugly about a 1.0 cm O. D. B''-alumina tube. An AISI stanless steel cylinder with a 2cm I. D. was disposed concentrically about said B''-alumina tube. The cell is essentially the one shown in part in FIG. 5. An analysis of internal cell losses is given in the table which is set forth below which shows that on charging in the two phase region all internal losses are iR voltage drops due to ceramic resistance, stainless steel #446 electrode resistance, and melt resistance between the ceramic and the electrode. These losses can be decreased only by improving ceramic conductance, metal electrode conductivity or by bringing the electrode surface even closer to the ceramic so that the average path length of melt between ceramic and metal is reduced. Since the metal is already in close contact with the ceramic, improvement could come only from the use of porous metal or metal felt, by means of which more metal surface could be brought close to the ceramic. The important feature is that the electrode polarization, which decreases the efficiency of most batteries, is kept to a minimum.

TABLE

Electrode Polarization and iR Drop in Metal Cell at 330° C
(Theoretical Capacity - 5.11 Ah)

| Amp-hrs. charged at 125 ma/cm² starting from full discharge | iR* (Volts) | Electrode Polarization (Volts) | Terminal Cell Voltage |
|---|---|---|---|
| One phase region and polarization data not yet available | | | |
| 0.50 | — | — | 2.150 |
| Two phase region | | | |
| 2.10 | .183 | 0 | 2.260 |
| 4.80 | .213 | 0 | 2.290 |
| Amp-hrs. discharged at 78 ma/cm² starting from full charge | | | |
| Two phase region | | | |
| 0.88 | .103 | .149 | 1.825 |
| One phase region | | | |
| 4.03 | .118 | .216 | 1.586 |
| 4.34 | .118 | .634 | 1.118 |

*Includes melt, metal electrode and ceramic resistance.

During charge at 125 ma/cm², about 0.090 V is due to the ceramic. During discharge at 78 ma/cm² about 0.056 V. is due to the ceramic.

After several weeks the cell performance began to slowly deteriorate. It was found that the oxide was too thin to protect the metal from corrosion. The example illustrates the type of cell performance obtained at oxide electrodes for short periods of time. More practical examples representative of the claimed invention, in which oxide coatings of a thickness of at least 500 Angstroms are employed, follow.

EXAMPLE II

The cell is indentical in all respects to the one in example I, except the electrodes are made of Inconel #671 sheets formed into cylinders. Prior to assembly into the cell the Inconel electrodes are passivated in 55 at% HNO₃ at 55° C for 30 minutes. The electrodes are then heated in air at 750° C for 1 hour, and then let cool in ambient air. They are then assembled into the cell.

EXAMPLE III

The cell is identical to example I except that the electrodes are made of thin porous nickel plaques of the type used in nickel-cadmium batteries. The plaques are perforated such that about 25% of the plaque area is removed. The plaques are then formed into cylinders. The nickel cylinders are heated in air to 600° C for 30 minutes. They are then cooled and impregnated with a concentrated solution of nickel nitrate and lithium nitrate - 1000g and 200g respectively in 1 liter of water. Then the plaques are dried at 120° C followed by thermal decomposition of the nitrates to the oxides at 350° C in air. This results in a conductive coating of lithium doped nickel oxide ($Li_xNi_{1-x}O$). The electrodes are then assembled into the cell.

EXAMPLE IV

The cell is identical to example I except that the electrodes are made of steel or stainless steel and then chromium plated with a commercial plating process, such as M & T Chemicals' chrome plating process #843, which yields a chromium plate of intermediate crack density. The crhomium plate need be heated in air at 600° C for only about 10 minutes to give a chromium trioxide layer about 0.1 micrometer thick. This thickness has a film resistivity of about 1 ohm-cm$^2$ at 300° C. The film provides superior corrosion resistance over stainless steel or virgin chromium plate and is polysulfide wettable. The electrodes are then assembled into the cell.

In view of this disclosure, many modifications of the improvement of this invention will be apparent to those skilled in the art. It is intended that all such modifications which fall within the scope of this invention be included within the terms of the appended claims.

I claim:

1. In a secondary battery or cell comprising:
    (A) an anodic reaction zone containing a molten alkali metal reactant-anode in electrical contact with an external circuit;
    (B) a cathodic reaction zone containing a cathodic reactant which, when said battery or cell is at least partially discharged, is selected from the group consisting of (i) a single phase composition comprising molten polysulfide salts of said anodic reactant, and (ii) a two-phase composition comprising molten sulfur and molten sulfur saturated polysulfide salts of said anodic reactant;
    (C) a cation-permeable barrier to mass liquid transfer interposed between and in contact with said anodic and cathodic reaction zones; and
    (D) an electrode which is disposed within said cathodic reaction zone such that it is (i) at least partially immersed in said cathodic reactant and (ii) in electrical contact with both said cation-permeable barrier and said external circuit,
    the improvement wherein at least a portion of said electrode consists essentially of a porous metal substrate which (i) is coated, at least in part, with an oxide of a metal selected from the group consisting of
    (a) metals of Groups I, II and III of the Periodic Table of Elements,
    (b) Transition Series metals, and
    (c) Tin, lead, antimony and bismuth to a thickness which is greater than about 500 Angstroms, but which results in said electrode portion having a resistivity of less than about 4 ohm-cm$^2$, (ii) does not fill the entire volume of said cathodic reaction zone, and (iii) is, at least in part, adjacent to and contiguous with said cation-permeable barrier.

2. A secondary battery or cell in accordance with claim 1 wherein said coating is selected from the group consisting of nickel oxide doped chromium oxide (NiO—CrO), lanthanum chromite ($LaCrO_3$), calcium doped lanthanum chromite ($La_{1-x}Ca_xCrO_3$), antimony peroxide doped tin oxide ($Sb_2O_5$-$SnO_2$), lithium doped nickel oxide ($Li_xNi_{1-x}O$), titanium doped ferric oxide ($Ti_xFe_{2-x}O_3$) and tantalum doped titanium oxide ($Ta_2O_5$-$TiO_2$).

3. A secondary battery or cell in accordance with claim 1 wherein said electrode consists essentially of said coated porous metal substrate.

4. A secondary battery or cell in accordance with claim 3 wherein said porous metal electrode portion is confined to an area of said cathodic reaction zone adjacent to said cation-permeable barrier.

5. A secondary battery or cell in accordance with claim 4 wherein said porous metal electrode portion is a coated, perforated metal sheet.

6. A secondary battery or cell in accordance with claim 3 wherein said porous metal electrode portion is disposed within said cathodic reaction zone such that said zone contains a plurality of channels or spaces which are free of said porous metal electrode portion and are adapted to allow flow within said zone of said cathodic reactant during operation of said battery or cell.

7. A secondary battery or cell in accordance with claim 1 wherein said electrode consists essentially of (i) said porous metal electrode portion and (ii) a second electrode portion formed of a material which during operation of said battery or cell, exhibits a contact angle with said sulfur which is less than the contact angle which it exhibits with said molten polysulfide.

8. A secondary battery or cell in accordance with claim 1 wherein said electrode consists essentially of (i) said porous metal electrode portion which is confined to an area of said cathodic reaction zone adjacent said cation-permeable barrier, and (ii) a second electrode portion consisting essentially of a conductive material which is electrically connected to said porous metal electrode portion, but which is spaced from said porous metal electrode portion so as to create a channel therebetween.

9. A secondary battery or cell in accordance with claim 1 wherein said coating is an oxide of the same metal as said porous metal substrate.

10. A secondary battery or cell in accordance with claim 1 wherein said coating is an oxide of a metal other than the metal of said porous metal substrate.

11. A secondary battery or cell in accordance with claim 1 comprising a container in which a tubular cation-permeable barrier is disposed so as to produce said anodic reaction zone internally thereof and said cathodic reaction zone between the outer surface of said cation-permeable barrier and the inner surface of said container.

12. A secondary battery or cell in accordance with claim 11 wherein said porous metal electrode portion is a coated perforated metal sheet which is contiguous with and wrapped around said cation-permeable barrier.

* * * * *